US012617698B2

(12) United States Patent
Herring

(10) Patent No.: US 12,617,698 B2
(45) Date of Patent: May 5, 2026

(54) ELECTROCATALYTIC REACTOR AND REMEDIATION OF WASTEWATER USING SAME

(71) Applicant: Rodney Herring, Victoria (CA)

(72) Inventor: Rodney Herring, Victoria (CA)

( * ) Notice: Subject to any disclaimer, the term of this patent is extended or adjusted under 35 U.S.C. 154(b) by 704 days.

(21) Appl. No.: 18/002,850

(22) PCT Filed: Jun. 24, 2021

(86) PCT No.: PCT/CA2021/050874
§ 371 (c)(1),
(2) Date: Dec. 21, 2022

(87) PCT Pub. No.: WO2021/258214
PCT Pub. Date: Dec. 30, 2021

(65) Prior Publication Data
US 2023/0242422 A1 Aug. 3, 2023

(30) Foreign Application Priority Data
Jun. 24, 2020 (CA) ................................ CA 3084778

(51) Int. Cl.
*C02F 1/461* (2023.01)
*C02F 1/00* (2023.01)
*C02F 1/467* (2023.01)

(52) U.S. Cl.
CPC .......... *C02F 1/46109* (2013.01); *C02F 1/004* (2013.01); *C02F 1/4672* (2013.01);
(Continued)

(58) Field of Classification Search
CPC ................ C02F 1/46109; C02F 1/4672; C02F 2001/46142; C02F 2001/46157;
(Continued)

(56) References Cited

U.S. PATENT DOCUMENTS

| | | | |
|---|---|---|---|
| 5,932,111 A | 8/1999 | Christensen |
| 2009/0301859 A1 | 12/2009 | Sahle-demessie |

(Continued)

FOREIGN PATENT DOCUMENTS

| | | | | |
|---|---|---|---|---|
| DE | 102013007992 A1 * | 11/2014 | .............. | C02F 3/005 |
| KR | 10-2017-0055029 | 4/2017 | | |
| WO | WO2020160638 | 8/2020 | | |

OTHER PUBLICATIONS

WIPO, Canadian International Searching Authority, International Search Report mailed Aug. 31, 2021, International Patent Application No. PCT/CA2021050874, 4 Pages.

(Continued)

*Primary Examiner* — Ciel P Contreras

(74) *Attorney, Agent, or Firm* — Baumgartner Patent Law, LLC; Marc Baumgartner

(57) ABSTRACT

A method of remediating wastewater is provided, the method comprising substantially submersing an electrocatalytic reactor in wastewater, the electrocatalytic reactor including an anode, which is mesh and defines a first bore, a filter layer, which is porous glass, carbon fiber or poly-paraphenylene terephthalamide, the filter layer including fibers and interstitial spaces between the fibers, an iron-doped titanium dioxide film on the fibers, the film including a surface that is substantially iron oxide free, the filter layer housed within the first bore and defining a second bore, a cathode, which is housed within the second bore, is mesh and defines an inner bore, and a perforated air tube housed within the inner bore; and providing at least a voltage of at least about 3 volts to the electrocatalytic reactor, in the absence of a light source, thereby remediating wastewater.

13 Claims, 9 Drawing Sheets

(52) U.S. Cl.
CPC ............... *C02F 2001/46142* (2013.01); *C02F 2001/46157* (2013.01); *C02F 2001/46171* (2013.01); *C02F 2201/4619* (2013.01)

(58) Field of Classification Search
CPC .... C02F 2001/46171; C02F 2201/4619; C02F 1/004
See application file for complete search history.

(56) References Cited

U.S. PATENT DOCUMENTS

| | | |
|---|---|---|
| 2012/0279872 A1 | 11/2012 | Chen |
| 2015/0027879 A1 | 1/2015 | Myre |
| 2015/0284267 A1 | 10/2015 | Andrews |
| 2016/0332902 A1 | 11/2016 | Barry |
| 2016/0355411 A1 | 12/2016 | Fahs |
| 2017/0247273 A1 | 8/2017 | Angelidaki |
| 2018/0319680 A1 | 11/2018 | Ben Salah |

OTHER PUBLICATIONS

WIPO, Canadian International Searching Authority, Written Opinion of the International Searching Authority mailed Aug. 31, 2021, International Patent Application No. PCT/CA2021050874, 7 Pages.
"Nano Anti-Microbial Solution", GENS Nano Technology in Life (47 pages) http://www.mchnanosolutions.com/.
Khashman and Bisharat, "Photocatalytic Degradation of Phenol using Fe—TiO2 by Different Illumination Sources", International Journal of Chemistry, 2(2):10-18, 2010.

* cited by examiner

ELECTROCATALYTIC REACTOR AND REMEDIATION OF WASTEWATER USING SAME

CROSS REFERENCE TO RELATED APPLICATIONS

The present invention is filed under 35 U.S.C. § 371 as the U.S. national phase of International Application No. PCT/CA2021/050874, filed Jun. 24, 2021, which designated the U.S. and claims the benefit of Canadian Patent Application Serial No. 3084778, filed on Jun. 24, 2020 and entitled ELECTROCATALYTIC REACTOR AND REMEDIATION OF WASTEWATER USING SAME, which are hereby incorporated in their entirety including all tables, figures, and claims.

FIELD

The present technology is directed to a method of remediating wastewater with an electrocatalytic reactor in the absence of light. More specifically, it is a method of electrocatalytically remediating wastewater in the dark with an electrocatalytic reactor which includes at least one low iron oxide, iron-doped titanium dioxide activated fiberglass filter.

BACKGROUND

Wastewater remediation generally requires a high-power input and very frequently relies on ultraviolet light. Wastewater treatment using $TiO_2$ as a photocatalyst has attracted a great deal of attention because of its high activity, chemical stability, robustness against photo-corrosion, low toxicity, low pollution load, and availability at low cost. However, the shortcomings of conventional powder catalysts include low efficiency of light use, difficulty of stirring during reaction and separation after reaction (usually using ultra-filtration), and low-concentration contamination near $TiO_2$ due to its low surface area.

United States Patent Application 20090301859 discloses that a reactor produces a surface corona for emitting UV light and for the production of ozone by passing air or oxygen through the surface corona. The emitted UV light activates a photocatalyst coated on a surface facing a surface with embedded electrodes which generate the surface corona. The photocatalyst is a thin film of nanoparticle $TiO_2$ with primary particle size of 0.02 to 0.2 .mu.m was deposited on a substrate by a flame aerosol method. The method combines ozonation and photocatalysis to provide effective and efficient oxidation of alcohols and hydrocarbons to value added products. The method can also be used for air and water cleaning. UV light does not penetrate a significant distance into liquid and does not pass through glass. Further, there is a high power requirement for UV lights.

The current methods used to perform $TiO_2$ photocatalysis also include the application of UV onto a $TiO_2$ surface coating in the presence of the target waste stream. There are three possible serious drawbacks of UV/$TiO_2$ photocatalysis technology that has resulted in the failure of the technology to become established as a successful industrial wastewater treatment technology. Firstly, the ability of the UV to effectively penetrate waste stream which could be turbid, secondly the limited effect of the $TiO_2$ catalyst due to the relatively small surface reaction area used in current systems, and thirdly UV has harmful effects on microbes. These drawbacks of $TiO_2$ result in low efficiency of photocatalytic activity in practical applications.

http://www.mchnanosolutions.com/ discloses the use of titanium dioxide for cleaning surfaces and decontamination of liquids. Their system is reliant upon ultraviolet (UV) light, which is expensive and which does not penetrate glass.

Other approaches focus on electrocatalysis. For example, U.S. Patent Application Publication No. 20180319680 discloses an electrolytic assembly and a method for the bacterial disinfection of water or wastewater. Water circulating in cooling towers such as those that discharge heat from air conditioning; ships' ballast water; or wastewater with a dryness varying from 0.01 to 3%; can be treated. The assembly comprises one or more electrolytic units comprising at least one Dimensionally Stable Anode commonly known as DSA, or a Boron Doped Diamond anode, also named BDD anode. The electrolytic treatment at least partially kill the bacteria present in the water. It has been shown that the electrolytic treatment breaks the cell membrane of bacteria present in the water. The treatment is particularly adapted for eliminating Legionella and others microorganisms, such as E. coli. Between 6 V and 40 V is applied in the electrolytic assembly. This approach does not remediate wastewater as it does not break down organic waste.

U.S. Patent Application Publication No. 20170247273 discloses a bio-electrochemical system (BES) and a method of in-situ production and removal of $H_2O_2$ using such a bio-electrochemical system (BES). Further, the invention relates to a method for in-situ control of $H_2O_2$ content in an aqueous system of advanced oxidation processes (AOPs) involving in-situ generation of hydroxyl radical (OH) by using such a bio-electrochemical system (BES) and to a method for treatment of wastewater and water disinfection. The bio-electrochemical system (BES) according to the invention comprises: —an aqueous cathode compartment comprising a first cathode and a second cathode, —an aqueous anode compartment comprising an anode at least partly covered in biofilm, wherein the first cathode is connected to a first circuit and the second cathode is connected to a second circuit, wherein the first and the second circuit are connected to the system by an external switch.

U.S. Patent Application Publication No. 20160355411 discloses a portable system for treatment of liquids, gases, or both using precise energy separation (PES) is described herein. The system includes a power generation component which charges one or more energy storage units and powers the PES component of the portable system. The PES component includes one or more energy of dissociation sources and the energy storage units power the sources to provide an effective amount, intensity, and frequency of a promoter energy to specifically dissociate one or more target bonds of the target molecule present in contaminated liquids, gases, or both. Optionally, the energy stored in the system can act as a supplementary or back up power source. Titanium dioxide as a catalyst or photocatalyst is disclosed. The voltage required is 50 to about 50000 Volts, or higher as needed.

U.S. Patent Application Publication No. 20160332902 discloses a photoelectrocatalytic oxidizing device having a photoanode being constructed from a conducting metal such as Ti as the support electrode. Alternatively, the photoanode is a composite electrode comprising a conducting metal such as Ti as the support electrode coated with a thin film of sintered nanoporous $TiO_2$. The device is useful in methods for treating an aqueous solution such as groundwater, wastewater, drinking water, ballast water, aquarium water, and aquaculture water to reduce amounts of a contaminant. The method being directed at reducing the amount and concentration of contaminants in an aqueous solution comprising providing an aqueous solution comprising at least one contaminant, and, photoelectrocatalytically oxidizing the contaminant, wherein the contaminant is oxidized by a free radical produced by a photoanode constructed from an anatase polymorph of Ti, a rutile polymorph of Ti, or a nanoporous film of TiO.sub.2. The application discloses that the effective voltage range may be in the range of −1 V to +12 V. The light source, as would be known to one skilled in the art, is ultraviolet light.

U.S. Patent Application Publication No. 20150284267 discloses devices and methods of treating aqueous solutions to help remove or otherwise reduce levels, concentrations or amounts of one or more contaminants. The disclosure relates to a system and apparatus which is adapted to receive components including at least one counter electrode (e.g. cathode) and at least one photoelectrode (e.g. anode) provided or arranged around at least one UV light source, and/or receive, contain and/or circulate fluid or aqueous solution. Titanium dioxide is disclosed as being a foil on at least one of the photoelectrodes. UV light does not penetrate a significant distance into liquid and does not pass through glass. Further, there is a high power requirement for UV lights.

U.S. Patent Application Publication No. 20150136591 discloses electrolytically treating water through influent inlet arrangements for cavitation and one or more pairs of electrodes. The electrodes can provide continuous anodic and cathodic operation for treating water. The pressurized influent premixed with oxidant gas can be pumped into the reactor vessel through the mixing nozzles arranged radially along the circumference. The polarity of the current to the electrode can be periodically reversed at a set interval. An electro-catalytic paddle electrode can be used for the treatment of flowback and produced water. The paddle electrode can consist of alternate pentagonal flat plate electrodes separated by adjustable variable distance Teflon spacers. The paddle electrode is provided with a chemical coating capable of switching/reversing the polarity of anodes and cathodes at ultra-high frequencies under very high current flowing conditions thus making it more efficient, stable and durable under demanding field conditions. This application discloses the use of UV light to produce hydroperoxyl on the cathode. UV light does not penetrate a significant distance into liquid and does not pass through glass. Further, there is a high power requirement for UV lights.

U.S. Patent Application Publication No. 20150027879 discloses point of service devices and methods of treating aqueous solutions to help remove or otherwise reduce levels, concentrations or amounts of one or more contaminants. The disclosure relates to a system including an apparatus including a substantially self-contained housing or container which is adapted to receive components including at least one counter electrode (e.g. cathode) and at least one photoelectrode (e.g. anode) provided or arranged around at least one UV light source, and/or receive, contain and/or circulate fluid or aqueous solution. Titanium dioxide is disclosed as being a foil on at least one of the photoelectrodes. UV light does not penetrate a significant distance into liquid and does not pass through glass. Further, there is a high power requirement for UV lights.

U.S. Patent Application Publication No. 20120279872 discloses the marriage of photocatalytic degradation and electrochemical oxidation to provide wastewater remediation and water purification based on the use of bifunctional electrodes. The bifunctional electrode provides for combined photocatalytic and electrochemical wastewater remediation for removing any one or combination of organic chemical pollutants, inorganic chemical pollutants and microorganisms. The electrode includes an electronically conducting substrate having a photocatalyst applied to a portion of the surface, the photocatalyst having a bandgap energy (E.sub.g), and an electrocatalyst applied to another portion of the surface. Under illumination the photocatalyst produces electron-hole pairs which are separated by an anodic bias potential applied across the photocatalyst. The same bias is applied across the electrocatalyst. The application of the anodic potential bias not only greatly enhances the performance of the photocatalyst for photooxidation of pollutants at the photocatalyst, but also effectively drives electrochemical oxidation of pollutants at the electrocatalyst surface. UV light does not penetrate a significant distance into liquid and does not pass through glass. Further, there is a high power requirement for UV lights.

KR101862989 discloses photocatalysis of wastewater using iron oxide doped titanium dioxide on activated carbon fiber. The light used for photocatalysis is in both the visible spectrum and the ultraviolet spectrum. As has been demonstrated in PCT/CA2020/000011, iron oxide on the surface of iron oxide doped titanium dioxide reduces the efficiency of the doped titanium dioxide. UV light does not penetrate a significant distance into liquid and does not pass through glass. Further, there is a high power requirement for UV lights.

A low iron oxide, iron-doped titanium dioxide visible light photoreactor is disclosed in PCT/CA2020/000011. The photoreactor comprises: a fiberglass sheet, which includes fibers and interstitial spaces between the fibers; and a low iron oxide content, iron-doped titanium dioxide film on the fibers, the film containing about 0.5 atomic percent iron and an iron oxide content of less than about 0.075 atomic percent iron. The photoreactor may be configured as a tube with a light emitting diode housed therein, a cap at one end of the tube that has inlets to accept pressurized air and a plate at the other end of the tube, such that the air is forced through the photoreactor. The power requirement for the visible light is relatively high.

What is needed is an apparatus and method that does not require light to remediate wastewater. It would be preferable if the power consumption was lower than that needed for photocatalysis. It would be preferable if the catalyst was inexpensive. It would be more preferable if it was highly reactive at low power levels.

SUMMARY

The present technology is an apparatus and method that does not require light to remediate wastewater. It has a low power requirement. The catalyst is inexpensive. It is highly reactive at low power levels.

In one embodiment, a method of remediating wastewater is provided, the method comprising substantially submersing an electrocatalytic reactor in wastewater, the electrocatalytic reactor including an anode, which is mesh and defines a first bore, a filter layer, which is porous glass, carbon fiber or poly-paraphenylene terephthalamide, the filter layer including fibers and interstitial spaces between the fibers, an iron-doped titanium dioxide film on the fibers, the film including a surface that is substantially iron oxide free, the filter layer housed within the first bore and defining a second bore, a cathode, which is housed within the second bore, is mesh and defines an inner bore, and a perforated air tube housed within the inner bore; and providing at least a voltage of at least about 3 volts to the electrocatalytic reactor, in the absence of an artificial light source, thereby remediating wastewater.

In the method, the voltage may be between about 3 volts and about 15 volts.

In the method, the voltage may be about 5 volts.

The method may further comprise urging air through the perforated air tube.

The method may be conducted in the dark.

In another embodiment, a system for remediating wastewater is provided, the system comprising:

a vessel;

an electrocatalytic reactor housed in the vessel, the electrocatalytic reactor including an anode, which is mesh and defines a first bore, a filter layer, which is porous glass, carbon fiber or poly-paraphenylene terephthalamide, the filter layer including fibers and interstitial spaces between the fibers, an iron-doped titanium dioxide film on the fibers, the film including a surface that is substantially iron oxide free, the filter layer housed within the first bore and defining a second bore, a cathode, which is housed within the second bore, is mesh and defines an inner bore, and a perforated air tube housed within the inner bore;

an air pump in gaseous communication with the perforated air tube and an air supply;

and a source of power in electrical communication with the air pump and the electrocatalytic reactor.

In the system, the vessel may be lightproof.

The system may further comprise a water pump which is housed in the vessel and is in electrical communication with the power source.

The system may further comprise an impeller which is housed in the vessel and is in electrical communication with the power source.

The system may further comprise a discontinuous layer of gold on the fibers.

In another embodiment, an electrocatalytic reactor is provided, the electrocatalytic reactor consisting of an anode, which is mesh and defines a first bore, a filter layer, which is porous glass, carbon fiber or poly-paraphenylene terephthalamide, the filter layer including fibers and interstitial spaces between the fibers, an iron-doped titanium dioxide film on the fibers, the film including a surface that is substantially iron oxide free, the filter layer housed within the first bore and defining a second bore, a cathode, which is housed within the second bore, is mesh and defines an inner bore, and a perforated air tube housed within the inner bore.

The electrocatalytic reactor may further comprise a discontinuous layer of gold on the fibers.

In one embodiment, a method of remediating wastewater is provided, the method comprising substantially submersing an electrocatalytic reactor in wastewater, the electrocatalytic reactor including an anode, which is mesh and defines a first bore, a filter layer, which is porous glass, carbon fiber or poly-paraphenylene terephthalamide, the filter layer including fibers and interstitial spaces between the fibers, a discontinuous layer of gold on the fibers and an iron-doped titanium dioxide film on the fibers, the film including a surface that is substantially iron oxide free, the filter layer housed within the first bore and defining a second bore, a cathode, which is housed within the second bore, is mesh and defines an inner bore, and a perforated air tube housed within the inner bore; and providing at least a voltage of at least about 3 volts to the electrocatalytic reactor, in the absence of an artificial light source, thereby remediating wastewater.

In the method, the voltage may be between about 3 volts and about 15 volts.

In the method, the voltage may be about 5 volts.

The method may further comprise urging air through the perforated air tube.

The method may be conducted in the dark.

FIGURES

Figure 7:
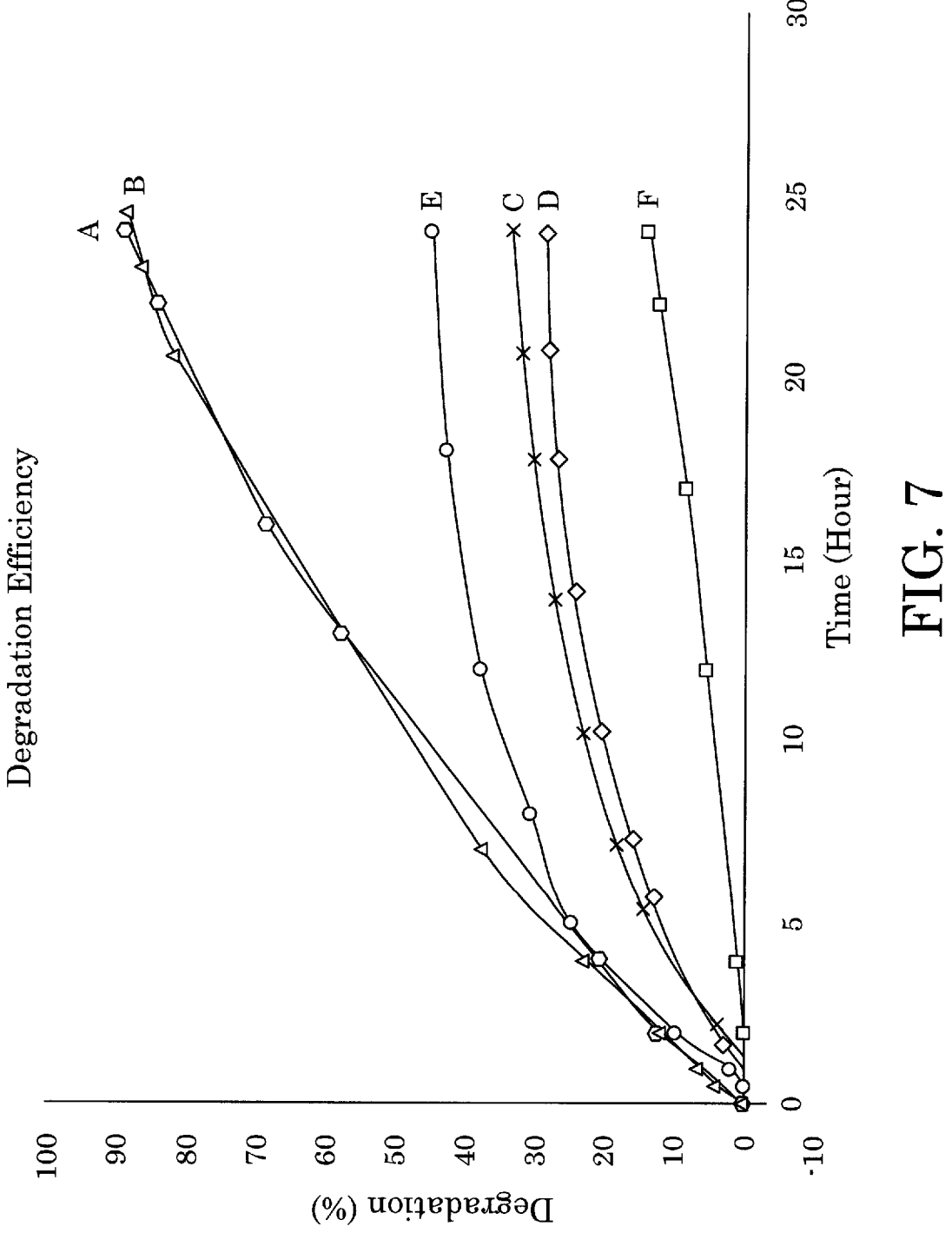

FIG. 7 is a graph showing degradation of methyl orange at 5 volts using the electrocatalytic reactor of the present technology in the dark (A) and during exposure to visible light (B), the electrocatalytic reactor with unwashed iron oxide doped titanium dioxide (C), the electrocatalytic reactor with undoped titanium dioxide (D) and the electrocatalytic reactor with non-activated fiberglass (E). (F) is the electrocatalytic reactor without any voltage applied.

Figure 8A:
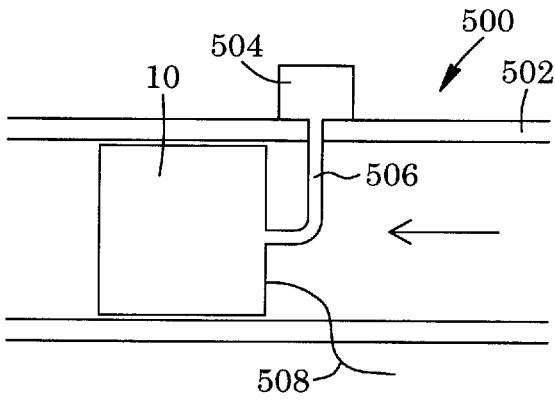
Figure 8B:
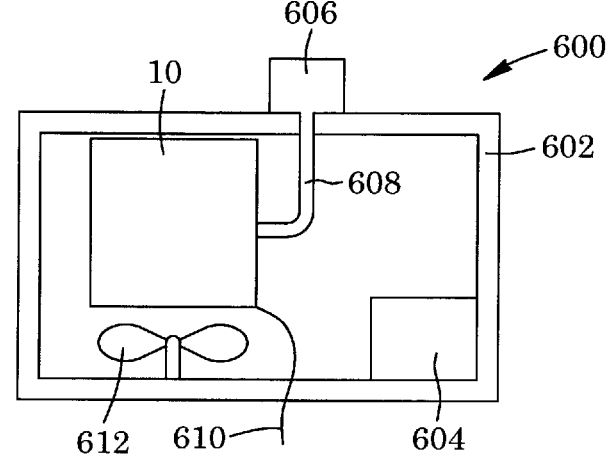
Figure 8C:
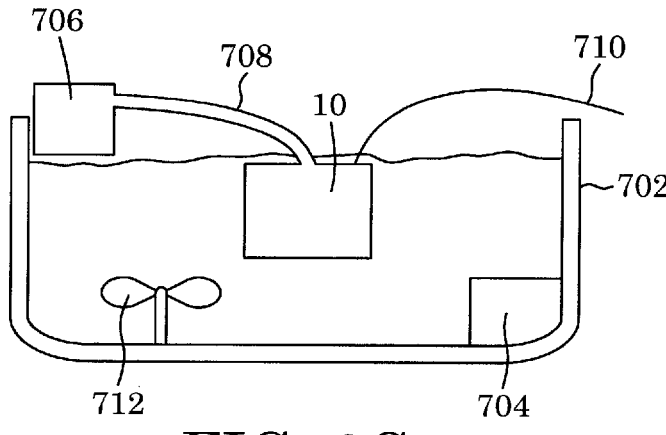

FIG. 8A is a schematic sectional view of a wastewater remediation system; FIG. 8B is a schematic sectional view of an alternative wastewater remediation system; and FIG. 8C is a schematic sectional view of another alternative wastewater remediation system.

Figure 9:
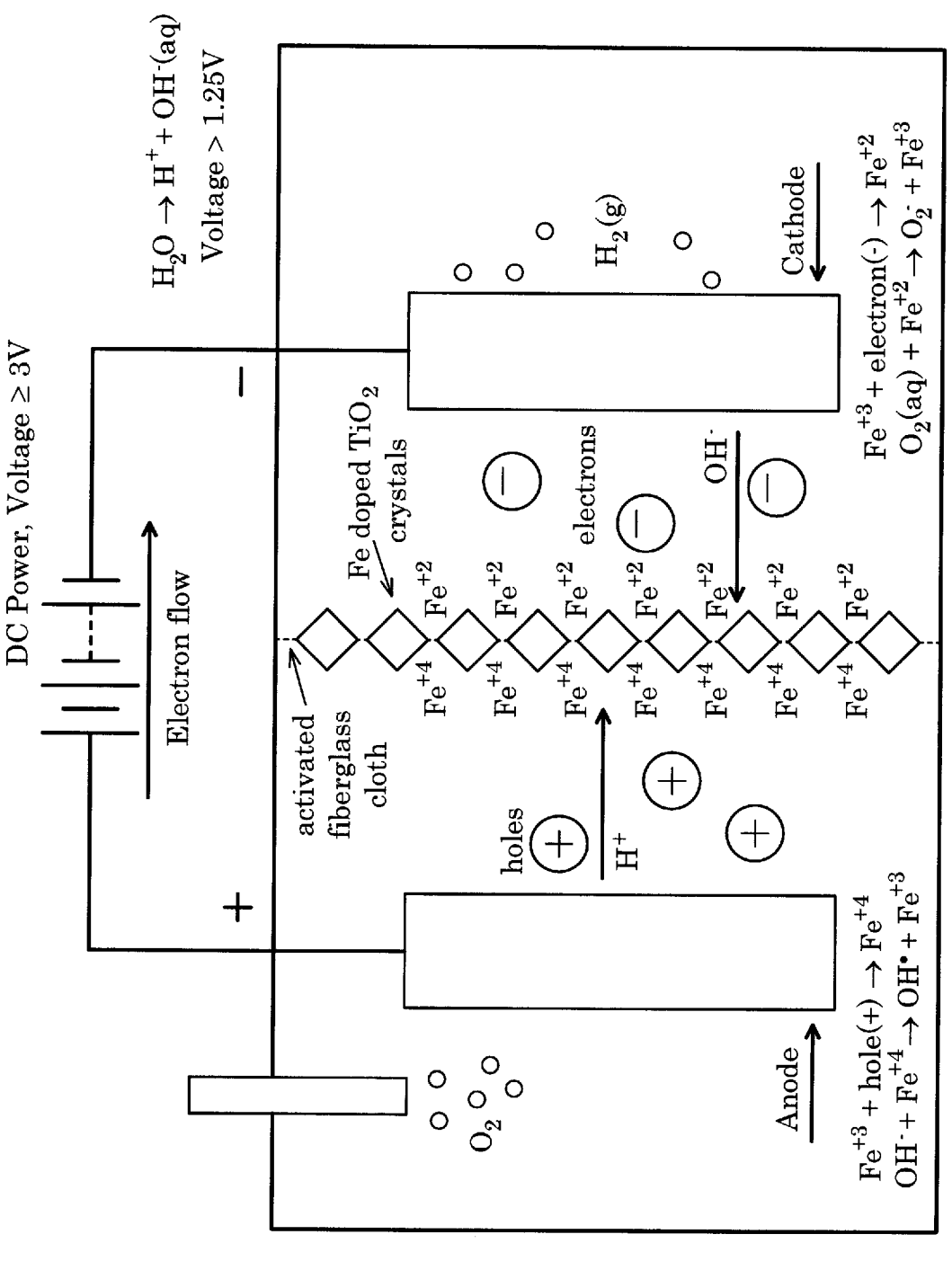

FIG. 9 is a schematic of the electrolytic activation of the low iron oxide, iron-doped titanium dioxide nanoparticles.

DESCRIPTION

Except as otherwise expressly provided, the following rules of interpretation apply to this specification: (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having,"

"including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Physical vapour deposition—in the context of the present technology, physical vapour deposition includes, but is not limited to, magnetron sputtering, ion beam sputtering, reactive sputtering, ion assist deposition, high target utilization sputtering, pulsed laser deposition and gas flow sputtering.

Thin film—in the context of the present technology, a thin film is up to 5 microns in thickness. A film may be a partial coating, a deposit upon a surface, a complete coating or a plurality of layers. To be clear, gaps may occur where the surface below is exposed. It may be formed by, for example, but not limited to growing nanocrystals on the substrate, physical vapour deposition on the substrate or photolithography on the substrate.

Iron-doped titanium dioxide with a low iron oxide surface—in the context of the present technology, iron-doped titanium dioxide with a low iron oxide surface has about 0.1 atomic % iron to about 2.0 atomic % iron, preferably 0.25 atomic % iron to about 0.75 atomic % iron, and more preferably 0.5 atomic % iron and very small amounts of iron oxide on its surface (less than 5% of the surface being iron oxide) when viewed with X-ray photoelectron spectroscopy.

Substantially iron oxide free surface—in the context of the present technology, a substantially iron oxide free surface has an iron oxide content corresponding to less than about 0.001% atomic iron (less than 0.5% of the surface being iron oxide) when viewed with X-ray photoelectron spectroscopy.

Porous glass—in the context of the present technology, porous glass includes fiberglass, sintered glass and any glass formed by other means. The porous glass has interstitial spaces which can be as large as 40,000 square microns.

Fiberglass fabric—in the context of the present technology, fiberglass fabric is comprised of glass threads in a plain weave. It may have any thread count, for example, but not limited to 20×14 to 60×52, to 70×70 and may have a thickness, of, for example, but not limited to 3 µm 0.01 mm to 0.23 mm to 1 mm to about 5 mm, depending on the application. The thread count and the thickness of the threads determines the porosity of the end product.

Carbon fiber fabric—in the context of the present technology, carbon fiber fabric is very similar to fiberglass fabric in terms of the weave, the thread count and the thread thickness. The threads are made of long carbon fibers.

Kevlar®—in the context of the present technology, Kevlar is a fabric made from poly-paraphenylene terephthalamide threads. Poly-paraphenylene terephthalamide fabric is very similar to fiberglass fabric in terms of the weave, the thread count and the thread thickness.

Moist air—in the context of the present technology, moist air is defined as having a relative humidity of at least about 45%.

Vessel—in the context of the present technology, a vessel is a pipe, a holding tank, a cistern, a septic tank, a pond and the like.

DETAILED DESCRIPTION

Figure 1B:
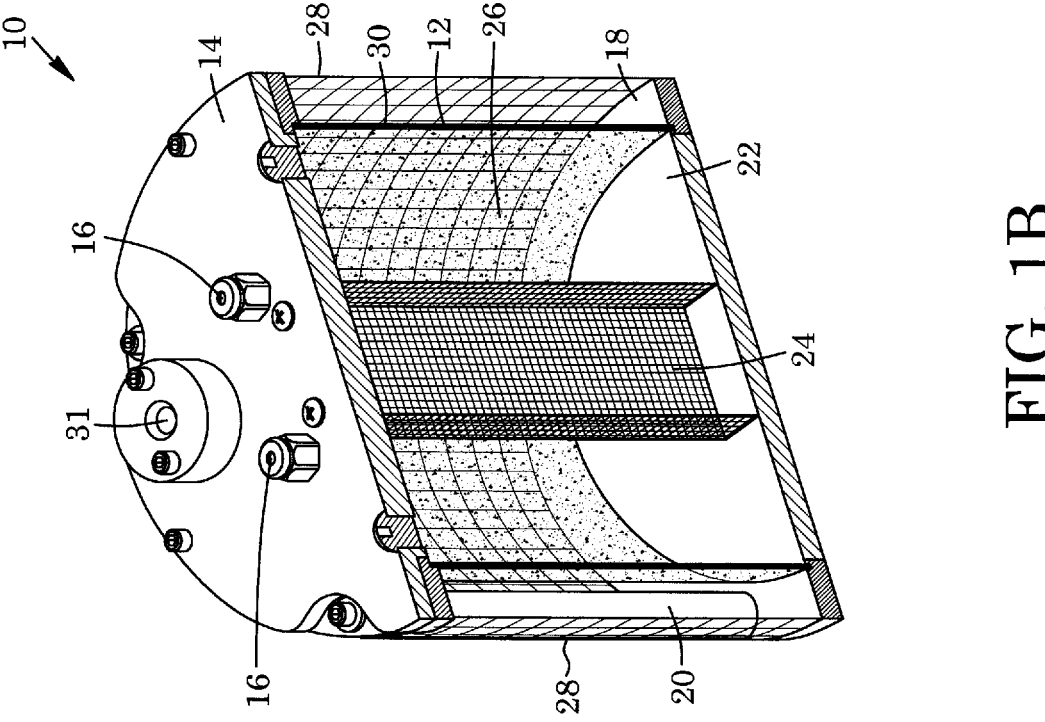
FIG. 1B is a medial sectional view of the electrocatalytic reactor of FIG. 1A.
Figure 1A:
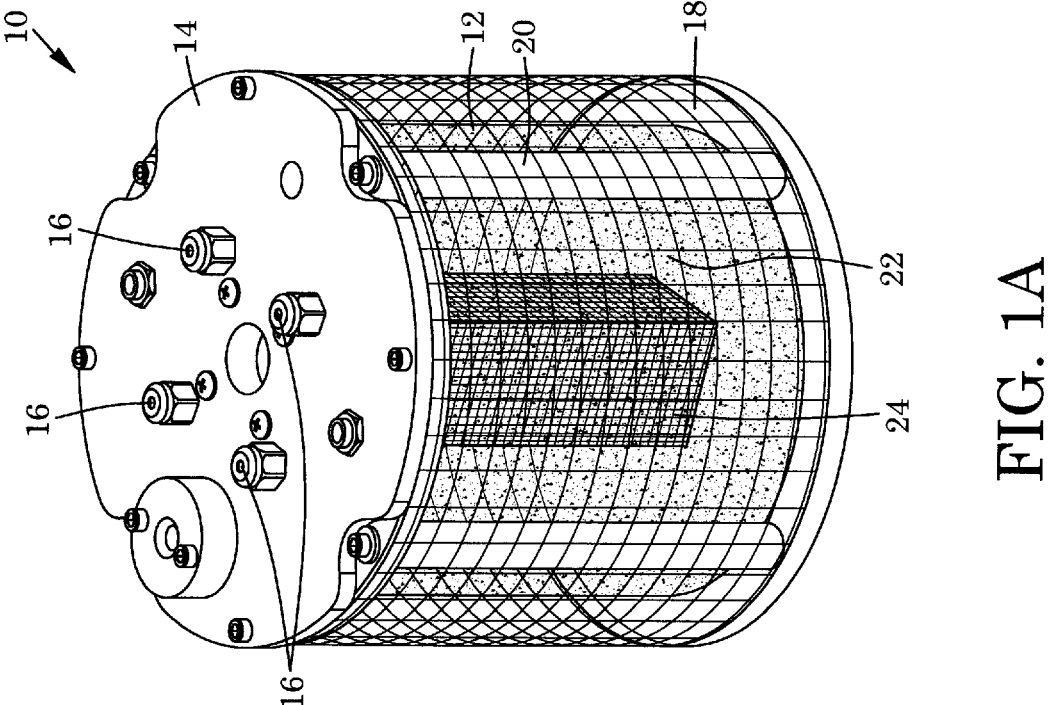
FIG. 1A is a perspective view of an electrocatalytic reactor apparatus for cleaning wastewater.

An electrocatalytic reactor, generally referred to as 10, is shown in FIGS. 1A and 1B. It has an outer filter 12 that is functionalized with low iron oxide or substantially iron oxide free, iron-doped titanium dioxide. The filter 12 is supported by a cap 14 at one end, which has a plurality of apertures 16 and a plate 18 at the other end, with supports members 20 extending between the cap 14 and the plate 18. The outer filter 12 may be one or more layers thick, with up to eight layers being contemplated. The cap 14, the plate 18 and the support members 20 form a frame. A cathode 24 is located in the bore 26 defined by the outer filter 12. An anode 28 is located around the outer surface 30 of the outer filter 12. An electrical connector 31 extends through the cap 14 to provide power lines to the anode 28 and cathode 24.

Figure 2:
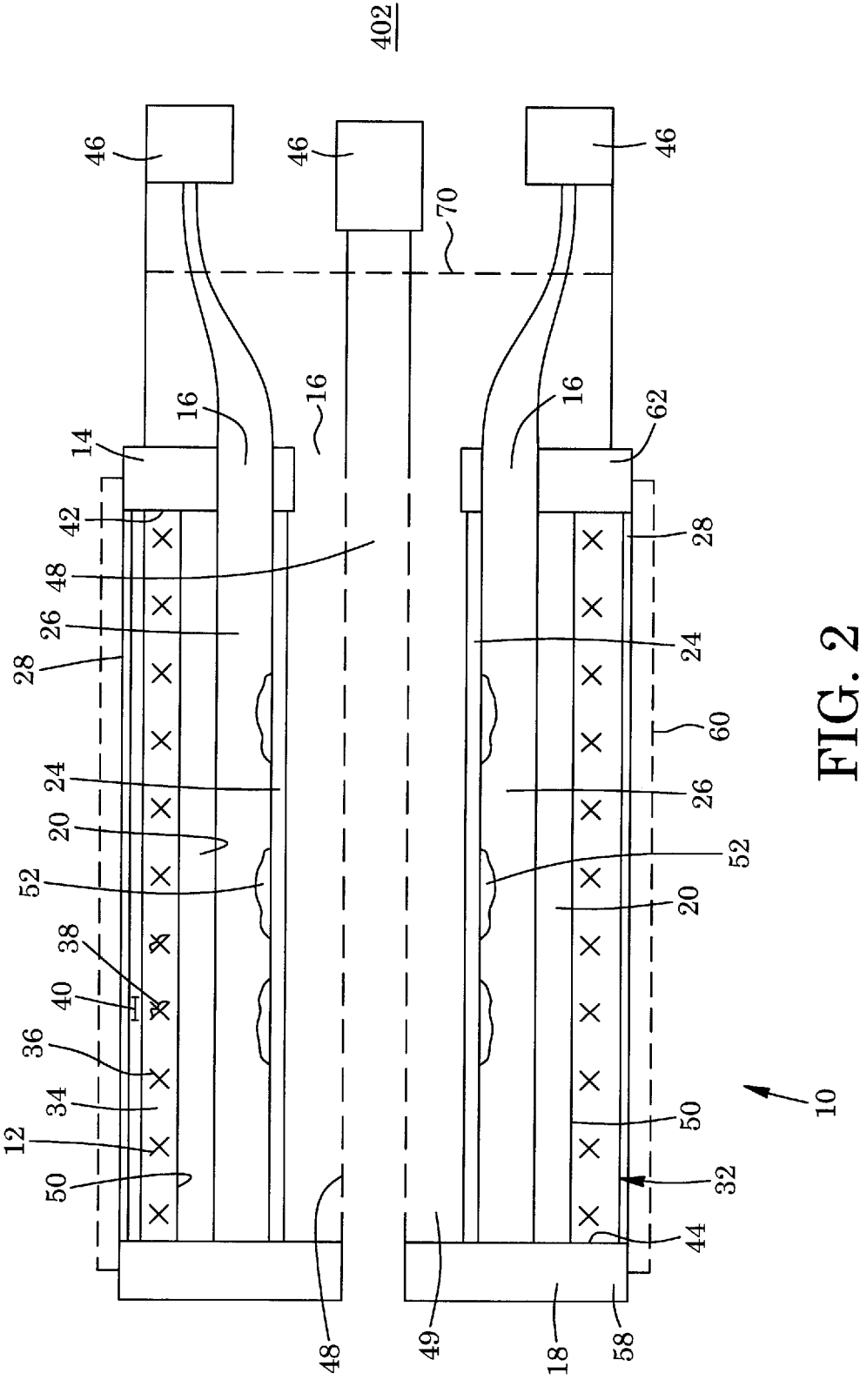
FIG. 2 is a schematic of a medial sectional view of the electrocatalytic reactor of FIG. 1A for cleaning water.

As shown in FIG. 2, in the electrocatalytic reactor 10, the outer filter 12 is a porous glass tube, generally referred to as 32, which is preferably fiberglass fabric with interstitial spaces 34 between the threads 36 of the tube 32 and a continuous or discontinuous film 38. The film 38 has a thickness 40 of up to about 5 microns on the threads 32. The film 38 is low iron oxide, or substantially iron oxide free, iron-doped titanium dioxide and preferably contains about 0.5 atomic % iron. In the preferred embodiment, the film 38 is discontinuous and is nanocrystals of low iron oxide, or substantially iron oxide free, iron-doped titanium dioxide. More specifically, the surface of the film is low iron oxide or substantially iron oxide free. A cap 14 is affixed to a first end 42 of the porous glass tube 34 and a plate 18 is affixed on to a second end 44 of the porous glass tube 34. The cap 14 has a plurality of apertures 16. An air source 46 provides air to a perforated air tube 48 that extends the length of the bore 26 of the porous glass tube 34 within the bore 49 of the cathode 24. Extending between and attached to the cap 14 and the plate 18 are the support members 20 which are rods. The support rods 20 maintain the tube shape. The support rods 20 are located in the bore 26 of the porous glass tube 34 and press against the inner wall 50 of the porous glass tube 34.

The cathode 24 may be functionalized with a continuous or discontinuous film 52 of low iron oxide, iron-doped titanium dioxide. An anode 28 is outside of the porous glass tube 32 and surrounds it.

An outer protective mesh 60 surrounds at least the anode 28 of the electrocatalytic reactor 10. It is preferably affixed to the outer circumference 56 of the cap 14 and the outer circumference 58 of the plate 18. A prefilter 70 may be placed upstream from the electrocatalytic reactor 10. The shape of the porous glass tube 34 is dictated by the arrangement of the support rods 20 and may be, for example, but not limited to, round, square, octagonal, hexagonal, and elliptical.

Figures 3A, 3B, 3C:
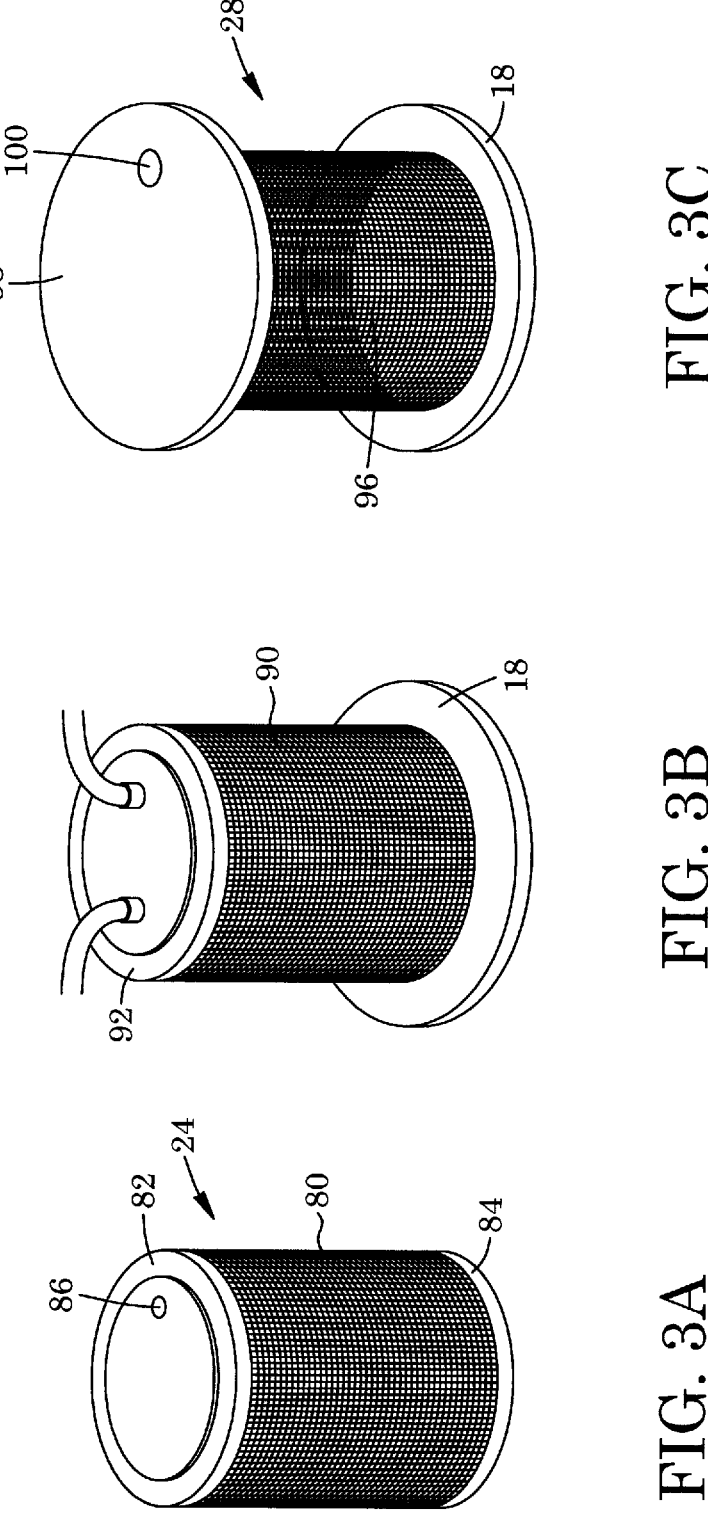
FIG. 3A is a perspective view of the cathode.
FIG. 3B is a perspective view of the filter.
FIG. 3C is a perspective view of the anode.

As shown in FIG. 3A, the cathode 24 is a tubular metal screen or mesh 80 with a top 82 and a base 84. The top has an electrical connector 86. As shown in FIG. 3B, a low iron oxide, iron-doped titanium dioxide activated mesh 90, which is preferably a plurality of fiberglass sheets, extends between the top 92 and the base 18. The fibers of the outermost layer have gold deposited on them as a thin discontinuous layer about 80 to 100 nm thick prior to being activated with the low iron oxide, iron-doped titanium dioxide. The layer is a discontinuous layer to ensure that the low iron oxide, iron-doped titanium dioxide adheres to the fiber of the fiberglass mesh 90. Without being bound to theory, the gold functions by capturing the charges of the electrolytic ions passing through the gold-coated activated fiberglass cloth and transferring the charges to the crystals to activate them to produce electrons and positive holes for producing superoxide and hydroxyl radicals. This therefore further increases the efficiency of cleaning.

As shown in FIG. 3C, the anode, generally referred to as 54 is a tubular metal screen or mesh 96 with a top 98 and the base 18. The top 98 has an electrical connector 100. The cathode 24 is inside the low iron oxide, iron-doped titanium dioxide activated mesh 90, which is inside the anode 28.

Figure 4:
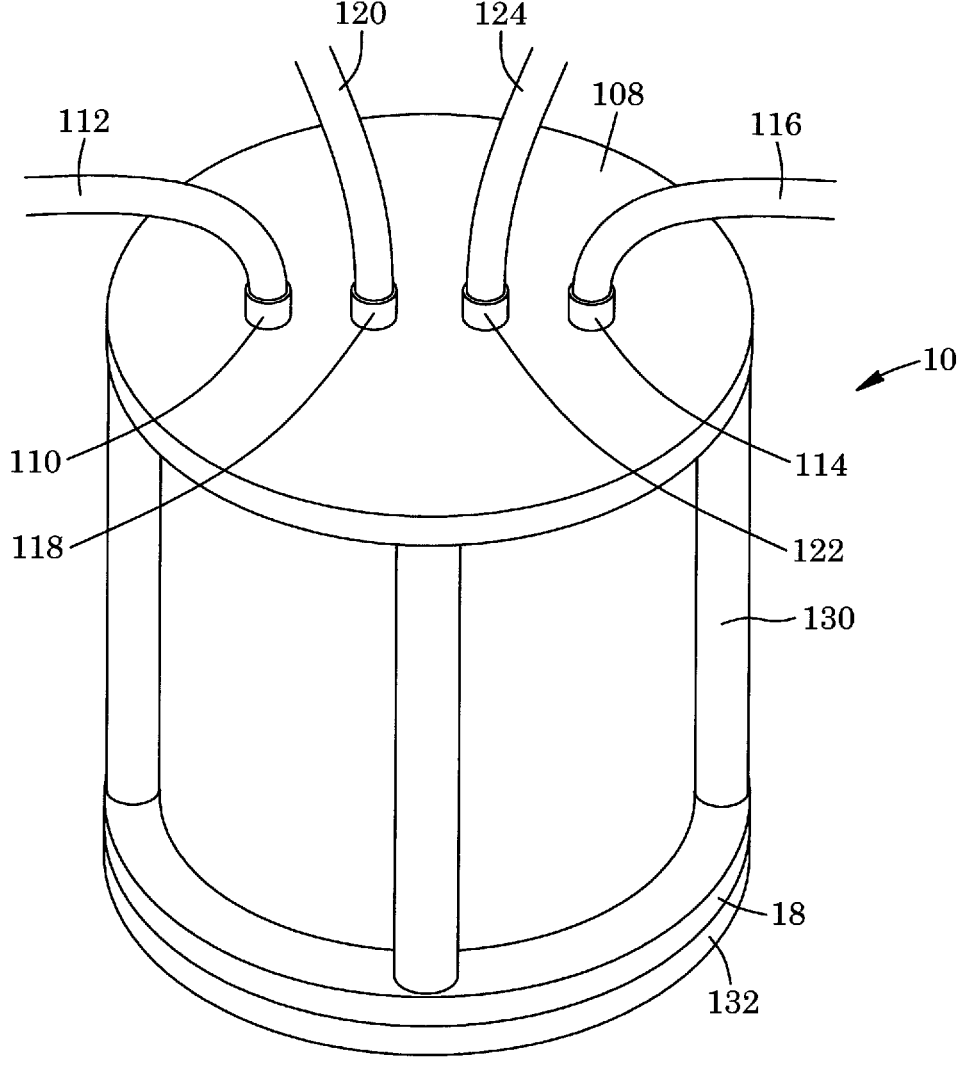
FIG. 4 is a perspective view of the assembled electrocatalytic reactor.

The assembled electrocatalytic reactor 10 is shown in FIG. 4. A lid 108 has a first electrical connection 110 for an incoming power line 112, a second electrical connection 114 for an outgoing power line 116, an air inlet 118 connected to an incoming air line 120 and a second air inlet 122 connected to another incoming air line 124. The lid 108 is connected to outer struts 130, which extend from the lid 108 to the base 18. A heater 132 is attached to the base 18 to heat the electrocatalytic reactor 10. Without being bound to theory, heat reduces the bandgap. The heat reduces the bandgap of titanium dioxide further, thus allowing the titanium dioxide to absorb a larger range of wavelengths of light.

The total volume of the electrocatalytic reactor 10 can be scaled. The area ratio between the cathode 24 and the anode 28 is variable, however, in general the ratio is preferably about 1:1, noting that the cathode area is slightly smaller than the anode area because of the fiberglass sheets in between, or if arranged with the anode on the inside and the cathode on the outside, the anode area is slightly smaller than the anode area. As the size of the electrocatalytic reactor 10 increases the ratio approaches the theoretical limit of 1:1 where the area of the anode equals the area of the cathode. While the figures show the cathode 24, the filter 28 and the anode 28 as being tubular, they may have a cross section that is, for example, but not limited to rectangular, or round, square, octagonal, hexagonal, elliptical or combinations thereof.

Figure 5:
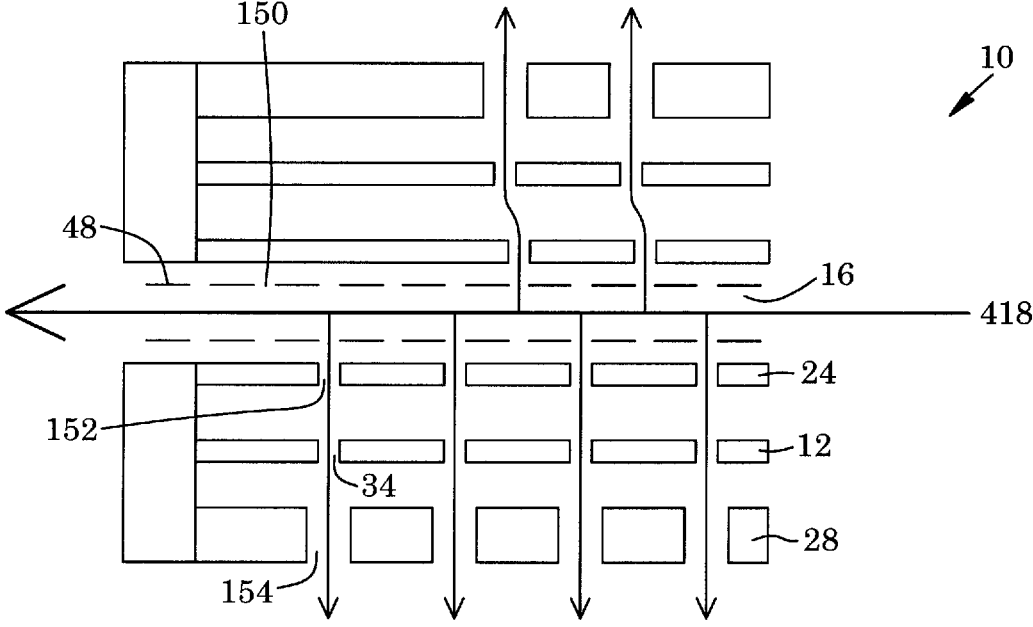
FIG. 5 is a medial view showing air and wastewater flow through the electrocatalytic reactor.

As shown in FIG. 5, humid air 4128 is blown, under force, through the aperture 16 into the perforated air tube 48, through the perforations 150 to the cathode 24, through the interstitial spaces 152 of the mesh of the cathode 24 to the filter 12, through the filter interstitial spaces 34 to the anode 28 and finally through the interstitial spaces 154 of the mesh of the anode 28. The air takes oxidants (oxidizing radicals) produced by the air and nanocrystals in the film 38. The liquid, which may be wastewater, and may have, as contaminants, organic compounds, small organic particulates, phosphates, organometals, and/or ammonia, is cleaned by the nanocrystals which are described in WO2018064747 as it flows over the electrocatalytic reactor 10.

One method of preparing the low iron oxide, iron-doped titanium dioxide functionalized fiberglass or sintered glass is as follows:

The iron-doped titanium dioxide nanoparticles were prepared by the sol-gel method using titanium isopropoxide (TTIP) as the precursor and ferric nitrate (Fe(NO3)3.9H2O) as the iron source. Firstly, the desired amount of ferric nitrate (0.25, 0.5, 1, 5 and 10 molar %) was dissolved in water and then the solution was added to 30 mL of anhydrous ethyl alcohol and stirred for 10 minutes. The acidity of the solution was adjusted to about pH 3 (about pH 2.5 to about pH 3.5) using HNO3 (other acids could also be used), which produces better Fe doped TiO2, i.e., incorporation of Fe into the TiO2 nanocrystals. Secondly, TTIP was added dropwise to the solution. Then deionized water with the ratio of Ti:H2O (1:4) was added to the mixture. The solution was stirred for two hours, poured onto the fiberglass fabric and then dried at 80° C. to form particles on the fiberglass fabric. The combination of the particles and the fiberglass fabric was then washed three times with deionized water. Next, the combination was calcined at 400° C. for one hour to adhere the iron-doped titanium dioxide nanoparticles to the fiberglass fibers of the fabric, thus producing functionalized fiberglass. The functionalized fiberglass was washed in an HCl solution (acid washed) and then washed with deionized water three times. The acid washing was in a solution of about pH 2.5 to about pH 3.5, or about pH 4, with, preferably, a monoprotic acid, such as, for example, but not limited to acetic acid (CH3CO2H or HOAc), hydrochloric acid (HCl), hydroiodic acid (HI), hydrobromic acid (HBr), perchloric acid (HClO4), nitric acid (HNO3) or sulfuric acid (H2SO4), with HCl being the preferred. Through analysis, it was shown that the nanoparticles bind to the fiberglass fibers or the sintered glass. The binding between the glass and Fe doped $TiO_2$ is between the oxygen ions and not between Si and Ti ions.

A second method of preparing the low iron oxide, iron-doped titanium dioxide functionalized fiberglass or sintered glass is as follows:

The low iron oxide, iron-doped titanium dioxide nanoparticles were prepared by the sol-gel method using titanium isopropoxide (TTIP) as the precursor and ferric nitrate (Fe(NO$_3$)3.9H$_2$O) as the iron source. Firstly, the desired amount of ferric nitrate (0.25, 0.5, 1, 5 and 10 molar %) was dissolved in water and then the solution was added to 30 mL of anhydrous ethyl alcohol and stirred for 10 minutes. The acidity of the solution was adjusted to about pH 3 (about pH 2.5 to about pH 3.5) using HNO$_3$ (other acids could also be used), which produces better Fe doped TiO$_2$, i.e., incorporation of Fe into the TiO$_2$ nanocrystals. Secondly, TTIP was added dropwise to the solution. Then deionized water with the ratio of Ti:H$_2$O (1:4) was added to the mixture. The solution was stirred for two hours and then dried at 80° C. for two hours.

The powders were then washed three times with deionized water. Next, the powder was calcined at 400° C. for three hours. The calcined powder was stirred in an HCl solution (acid washed) and then washed with deionized water three times. The acid washing was in a solution of about pH 2.5 to about pH 3.5, or about pH 4, with, preferably, a monoprotic acid, such as, for example, but not limited to acetic acid (CH$_3$CO$_2$H or HOAc), hydrochloric acid (HCl), hydroiodic acid (HI), hydrobromic acid (HBr), perchloric acid (HClO$_4$), nitric acid (HNO$_3$) or sulfuric acid (H$_2$SO$_4$), with HCl being the preferred. The acid washing produced low iron oxide, iron-doped titanium dioxide. The low iron oxide, iron-doped titanium dioxide nanoparticles were suspended in water and either sprayed onto the fiberglass fabric or sintered glass, or the fiberglass fabric or sintered glass was immersed in the water. The combination of the fiberglass fabric and the low iron oxide, iron-doped titanium dioxide nanoparticles was calcined at 400° C. for four hours to adhere the low iron oxide, iron-doped titanium dioxide nanoparticles to the fiberglass fibers of the fabric, thus producing functionalized fiberglass. Through analysis, it was shown that the nanoparticles bind to the fiberglass fibers. The binding between the glass and Fe doped TiO$_2$ is between the oxygen ions and not between Si and Ti ions.

Regardless of the method of producing the low iron oxide, iron-doped titanium dioxide nanoparticle functionalized fiberglass fabric, the acid washing was shown to remove a significant amount of iron oxide from the surface of the nanoparticles. The acid-washed iron-doped titanium dioxide nanoparticles function as electrocatalysts.

Figure 6:
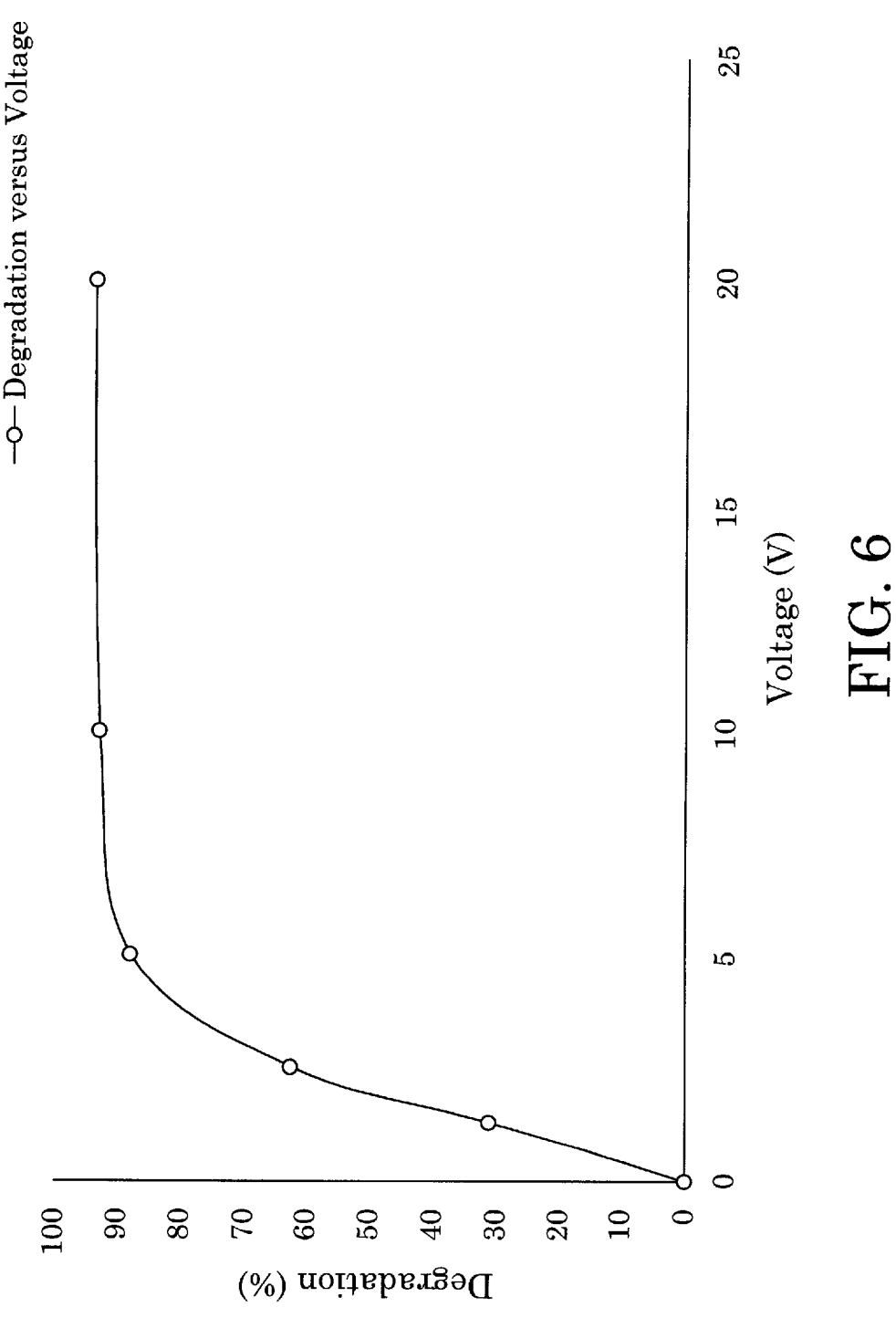
FIG. 6 is a graph showing voltage versus degradation of methyl orange with the electrocatalytic reactor of the present technology. Air was blown through the electrocatalytic reactor.

Degradation of 20 ppm methyl orange (MO) versus applied electrolytic voltage of the electrocatalytic reactor over a 24 hours period is shown in FIG. 6. Air was blown through the electrocatalytic reactor. Between 0 and 2.5 V (i.e., below 3 eV, the bandgap of Fe doped TiO2) there is a significant increase in degradation created by the electrolysis providing OH– ions necessary for the production of OH: radicals by the crystals. Above 2.5 V volts, the degradation reaches 90% and greater due to the electrolytic voltage being greater than 3 eV, i.e., electrolytic current activation of the crystals producing OH: radicals. Saturation at >90% MO is likely due to the separation of the remaining MO molecules determining the rate of degradation.

Degradation efficiency of the electrocatalytic reactor under different conditions at 5 V is shown in FIG. 7. The degradation efficiency was measured using 20 mgL-1 of MO solution within 24 hours of reaction time. The conditions were: in the dark with acid-washed iron-doped titanium dioxide (the acid washing provides a substantially iron oxide-free nanoparticle surface) (A); during exposure to visible light and with acid-washed iron-doped titanium dioxide (B); the electrocatalytic reactor with unwashed iron-doped titanium dioxide (C), the electrocatalytic reactor with undoped titanium dioxide (D) and the electrocatalytic reactor with non-activated fiberglass (E). (F) is the electrocatalytic reactor without any voltage applied.

(E) is the electrocatalytic reactor with just air without any voltage applied. In order to reach >90% degradation at 5 V, it is necessary to functionalize the fiberglass cloth with the substantially iron oxide free, iron doped titanium dioxide nanoparticles. The degradation efficiency of undoped titanium dioxide was 42%, which was about the same (40%) for unwashed iron-doped titanium dioxide. Advantageously, it was found that the electrocatalytic reactor, which includes a fiberglass filter that has fibers that have been functionalized with iron-doped titanium dioxide that has a substantially iron oxide free surface, and that has a discontinuous layer of gold on the fibers, was highly efficient at degrading methyl orange in an aqueous solution.

A wastewater remediation system, generally referred to as 500 is shown in FIG. 8A. It is a flow through system, with the electrocatalytic reactor 10 within a pipe 502. The direction of flow is shown with an arrow. An air pump 504 urges air through an air-line 506 into the perforated air tube 48 in the electrocatalytic reactor 10. Power is provided to the electrocatalytic reactor 10 by a power line 508. There is no natural or artificial light.

In an alternative embodiment shown in FIG. 8B, the wastewater remediation system, generally referred to as 600 includes a holding tank or cistern 602. A pump 604 circulates the wastewater within the holding tank or cistern 602. An air pump 606 urges air through an air-line 608 into the perforated air tube 48 in the electrocatalytic reactor 10.

Power is provided to the electrocatalytic reactor 10 by a power line 610. Optionally, there is an impeller 612 to assist in wastewater circulation. There is no natural or artificial light.

In another alternative embodiment, shown in FIG. 8C, the wastewater remediation system, generally referred to as 700 includes an open pond 702. A pump 704 circulates the wastewater within the open pond 702. An air pump 706 urges air through an air-line 708 into the perforated air tube 48 in the electrocatalytic reactor 10. Power is provided to the electrocatalytic reactor 10 by a power line 710. Optionally, there is an impeller 712 to assist in wastewater circulation. There is natural light, but no artificial light.

The electrocatalytic activation of the low iron oxide, iron-doped titanium dioxide nanoparticles is shown in FIG. 9.

While the technology has been described in detail, such a description is to be considered as exemplary and not restrictive in character and is to be understood that it is the presently preferred embodiments of the present technology and is thus representative of the subject matter which is broadly contemplated by the present technology, and that all changes and modifications that come within the spirit of the disclosure are desired to be protected.

The invention claimed is:

1. A method of remediating wastewater in the absence of a light source, the method comprising substantially submersing an electrocatalytic reactor in wastewater, the electrocatalytic reactor including an anode, which is mesh and defines a first bore, a filter layer which includes fibers and interstitial spaces between the fibers, wherein the fibers are fiberglass, carbon or poly-paraphenylene terephthalamide, an iron-doped titanium dioxide film on the fibers, the film including a surface that is less than 0.5% iron oxide, the filter layer housed within the first bore and defining a second bore, a cathode, which is housed within the second bore, is mesh and defines an inner bore, and a perforated air tube housed within the inner bore; and providing at least a voltage of at least about 3 volts to the electrocatalytic reactor, thereby remediating wastewater.

2. The method of claim 1, wherein the voltage is between about 3 volts and about 15 volts.

3. The method of claim 2, wherein the voltage is about 5 volts.

4. The method of claim 3, further comprising urging air through the perforated air tube.

5. A system for remediating wastewater in the absence of a light source, the system comprising:

a vessel;

an electrocatalytic reactor housed in the vessel, the electrocatalytic reactor including an anode, which is mesh and defines a first bore, a filter layer, which includes fibers and interstitial spaces between the fibers, wherein the fibers are fiberglass, carbon or poly-paraphenylene terephthalamide, an iron-doped titanium dioxide film on the fibers, the film including a surface that is less than 0.5% iron oxide, the filter layer housed within the first bore and defining a second bore, a cathode, which is housed within the second bore, is mesh and defines an inner bore, and a perforated air tube housed within the inner bore;

an air pump in gaseous communication with the perforated air tube and an air supply;

and a source of power in electrical communication with the air pump and the electrocatalytic reactor.

6. The system of claim 5, wherein the vessel is lightproof.

7. The system of claim 6, further comprising a water pump which is housed in the vessel and is in electrical communication with the power source.

8. The system of claim 7, further comprising an impeller which is housed in the vessel and is in electrical communication with the power source.

9. The system of claim 8, further comprising a discontinuous layer of gold on the fibers.

10. A method of remediating wastewater in the absence of a light source, the method comprising substantially submersing an electrocatalytic reactor in wastewater, the electrocatalytic reactor including an anode, which is mesh and defines a first bore, a filter layer which includes fibers and interstitial spaces between the fibers, wherein the fibers are fiberglass carbon or poly-paraphenylene terephthalamide, an iron-doped titanium dioxide film on the fibers, a discontinuous layer of gold on the iron-doped titanium dioxide film, the film including a surface that is less than 0.5% iron oxide, the filter layer housed within the first bore and defining a second bore, a cathode, which is housed within the second bore, is mesh and defines an inner bore, and a perforated air tube housed within the inner bore; and providing at least a voltage of at least about 3 volts to the electrocatalytic reactor, thereby remediating wastewater.

11. The method of claim 10, wherein the voltage is between about 3 volts and about 15 volts.

12. The method of claim 10, wherein the voltage is about 5 volts.

13. The method of claim 10, further comprising urging air through the perforated air tube.

\* \* \* \* \*